Patented Mar. 26, 1940

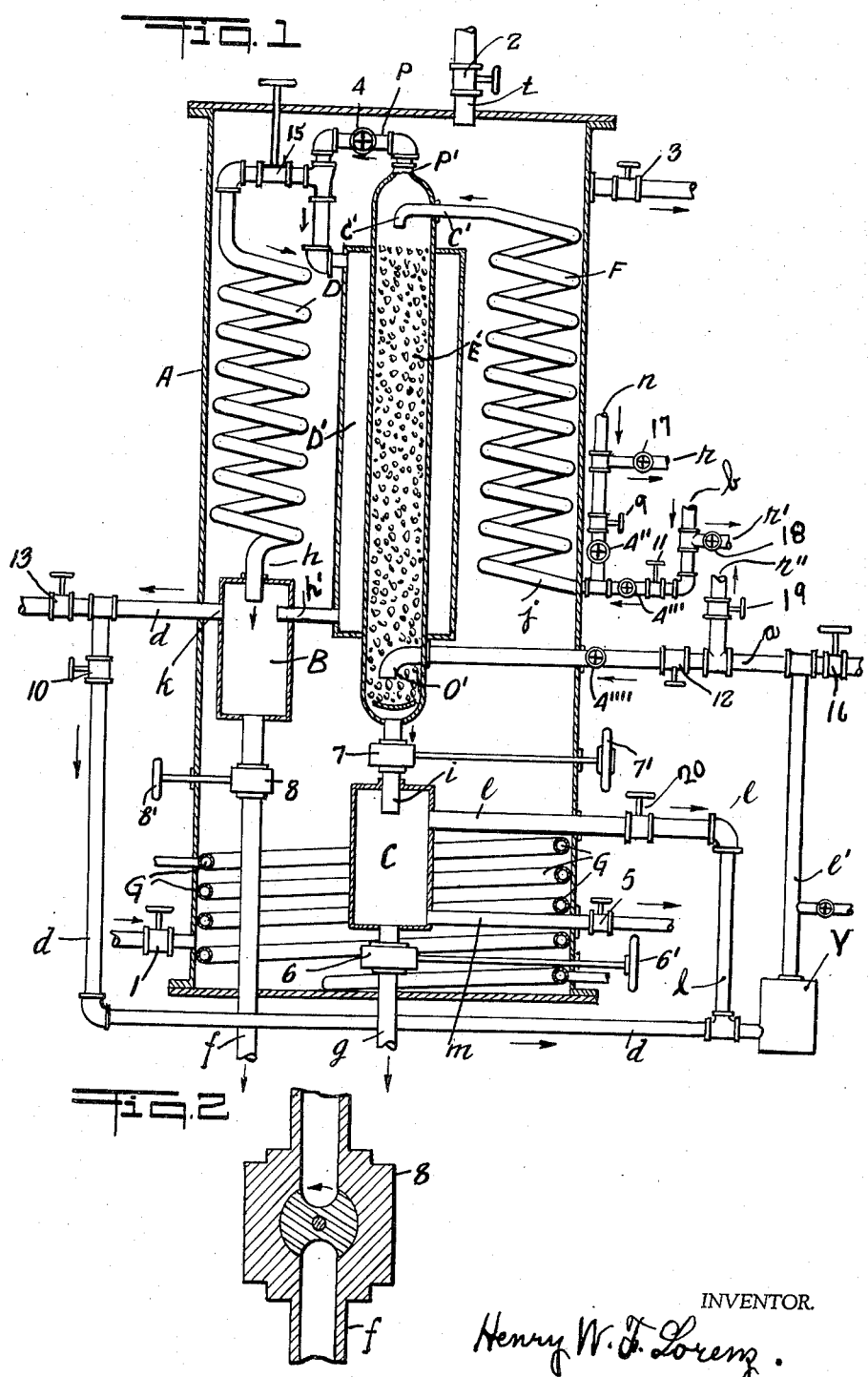

2,194,708

UNITED STATES PATENT OFFICE 2,194,708

APPARATUS FOR GASEOUS SOLVENT EXTRACTION

Henry W. F. Lorenz, Jersey City, N. J.

Application September 22, 1936, Serial No. 101,907

1 Claim. (Cl. 196—46)

This invention relates to an apparatus to be used in connection with my process for gaseous solvent extraction,—for extracting, fractionating, purifying, concentrating, evaporating, etc. liquids and/or solids, or mixtures of liquids and solids by gaseous solvent extraction,—as described in my co-pending application, Serial No. 96,247, Series of 1935, filed August 15, 1936. There are other uses to which my apparatus can be applied, as will appear elsewhere in this application.

The object of my present invention is to provide an apparatus for continuous fractionations, or separations, of materials and for obtaining the desired end products, or end product, by gaseous solvent extraction or treatment at or above the critical point of the gaseous medium or fluid employed, and including the use of pressure.

The apparatus has advantages over apparatus used in distillation, ordinary or with steam, or with the use of a vacuum, even a high vacuum, or with steam and vacuum, and evaporation generally. It also has advantages over apparatus used in socalled liquid solvent extraction, in that it allows the gaseous medium to be more rapidly and expediently and completely separated from the extract and raffinate, or residue, than liquids can be separated, for instance, where liquid solvents are used.

The speed of operation with my apparatus is also greater than is the case with apparatus used in distillation or liquid solvent extraction. Solvent losses are greater with apparatus used in the latter case than with my apparatus, where the same may be considered negligible. It is suitable for continuous processes, and permits operations to be carried out more expeditiously and cheaper than apparatus for processes heretofore known. It has a general applicability and can be used with a great many materials and for a variety of purposes.

Before specifically describing my apparatus for continuous gaseous solvent extraction, with the aid of the accompanying drawing, I desire to first elucidate the purposes of its use and to give a clear understanding of the subject and the principles involved in the use of said apparatus.

Andrews proposed many years ago the use of the word "gas" for a fluid at any temperature above its critical point, i. e. the temperature above which, no matter how high the pressure, the fluid cannot be liquefied. For every "gas" there is a certain temperature above which it cannot be liquefied even under the greatest pressure; with socalled "permanent gases" this is very low. "Gases" when under pressure, especially high pressures, can possess a high solvent power, particularly for more or less volatile materials, and even for bodies possessing little or no apparent volatility the dissolving power may be considerable, or, in other words, various substances when introduced into highly compresed gases above their critical temperature (hence not liquefied) evaporate at lower temperatures. Solvent power is hence not confirmed to liquids. This may be exerted even at ordinary temperature.

In some cases it is not necessary to apply very great pressures to demonstrate that the solubility of a liquid or a solid in a gas may be as great a liquid may be dissolved in 4–5 times its volume of a certain gas compresed to 150 atmospheres at as when using a liquid solvent. For example, 25° C. If the temperature is maintained but the pressure raised to 200 atmospheres, the quantity of liquid that can be dissolved may be such that the two fluids become miscible in all proportions and the liquid as such disappears. On the other hand, if the pressure is maintained at 150 atmospheres and the temperature raised to say 60° C., the same end-effect may be observed. The solubility of the liquid in the gas, therefore, increases with the increase in pressure or the temperature. At any given temperature, if the pressure is great enough, the gas saturated with the liquid will have the same composition as that of the liquid saturated with the gas, and the two fluids, on agitation, or stirring, form a uniform mixture. This is akin to heating a liquid (in a closed vessel) to its critical temperature, and we have a true critical point. The pressure at which the surface of the gas-liquid disappears varies with the temperature. Raising the temperature and keeping the pressure constant, or increasing the pressure and keeping the temperature constant gives the same result. In the case of any given gas and liquid there will be an unlimited number of critical points each of which corresponds to a definite pressure and temperature. Now, if the pressure is lowered with the mixed two fluids previously brought to the critical pressure, a simultaneous ebullition occurs. On releasing the pressure the liquid gives up a part of its dissolved gas and vice versa. On reducing the pressure further, to atmospheric or lower, the whole of the substance dissolved is separated, the dissolving power of the gas becoming practically nil.

Now, if instead of the case of a single liquid and a gas cited above, we have a mixture of liquids present of different boiling points and/or of different solubilities in a gas at its critical temperature or above it, the higher boiling, or less soluble ones, may remain undissolved during the treatment under the conditions stated, or may be first precipitated, if wholly dissolved, on reduction of the pressure. If these are withdrawn before the reduction of the pressure and the pressure on these as well as on the dissolved material is then reduced, say to atmospheric (or sub-atmospheric), we will have a sharp separation of the gas on the one hand and of the two separated liquids on the other.

The gas while still under pressure with the fraction dissolved in it may thus be separated from the undissolved, or the precipitated, residue, and the extract and raffinate separated from its accompanying gas by pressure reduction, or evacuation. There need be no loss of gas with gas-tight apparatus, and the heat of compression is absorbed by the gas expansion operation.

A large number of "gas" solvents are available. Working at ordinary temperatures, say up to 25° C., we have available such gases as methane, ethylene, carbon monoxide, hydrogen, nitrogen, nitric oxide, and their mixtures. As we ascend the critical temperature scale their number increases rapidly. For our pupose the height of the citical temperature scale is only limited by the stability of the material treated. We give here a list of available "gases", to which many others could be added:

In practice, pressures up to 50 atmospheres, or 100, 200, and 500 and even more atmospheres may be used.

The temperatures applicable in individual cases will depend on the material in hand, that is, the temperature found most suitable for carrying out the process should be one that will not cause any decomposition or other undesirable change in the material. It may be desirable to work the process below room temperature or at room temperature, or at a temperature above the same, in order to have a greater choice of "gaseous solvents."

I am not confined to the use of individual "gases" solely, mixtures of two or more gases may be employed, gases of higher and lower critical temperatures, etc., thus varying the solvent properties ad libitum, which can also be varied by varying the temperature and the pressure. There are advantages in using gas mixtures. It must also be kept in mind that the "extract" dissolved in the gaseous solvent medium has its effect markedly on the critical point of the gas or gas mixtures used.

"*Gas*" *mixtures of two or more* "*gases*".—A very large number of two or more gas mixtures are available from which to choose a suitable gas mixture. As just stated, it should also be noted that the critical point of a "gas" will vary considerably, being lower or higher, after it has taken up or dissolved its extract from the material under-

|  | Crit. temp., °C. | Crit. press. atms. |  | Crit. temp., °C. | Crit. press. atms. |
|---|---|---|---|---|---|
| *To 25° C.* |  |  | *To 250° C. (Continued)* |  |  |
| Ethylene | 9.7 | 51 | Dimethyl sulphide | 231 | 56 |
| Hydrogen | −239 | 32.5 | Ethylpropyl ether | 227 | 32 |
| Methane | −96 | 46 | Ethyl ether | 194 | 36 |
| Nitrogen | −147 | 33 | Ethyl alcohol | 243 | 63 |
| Nitric oxide—NO | −93.5 | 71.2 | Ethyl amine | 183 | 56 |
| Silicon fluoride | −94 | 65 | Ethyl bromide | 231 |  |
| Carbon monoxide | −141 | 36 | Ethyl chloride | 187 | 52 |
|  |  |  | Ethyl isocyanate |  |  |
| *To 50° C.* |  |  | Ethyl mercaptan | 225.5 | 54 |
| Acetylene | 36 | 62 | Ethyl nitrite |  |  |
| Carbon dioxide | 31 | 73 | Ethyl chlorformate | 235 |  |
| Ethane | 32 | 49 | Ethyl formate | 235 | 47 |
| Nitrous oxide | 36.5 | 72 | Ethyl acetate | 250 | 38 |
| Methyl fluoride | 45 | 62 | Ethyl allyl ether | 245 |  |
|  |  |  | Ethylene oxide | 192 |  |
| *To 150° C.* |  |  | Furfuran |  |  |
| Ammonia | 132.4 | 111.5 | Formaldehyde | 233.6 |  |
| Allylene | 128 |  | Hydriodic acid |  |  |
| i-Butane | 138 |  | Hydrofluoric acid |  |  |
| a-Butylene | 144 |  | Hydrocyanic acid | 183 | 50 |
| Carbon oxysulphide | 105 | 61 | n-Hexane | 235 | 30 |
| Cyanogen | 128 | 59 | Hexylene | 243.5 |  |
| Methyl ether | 127 | 52 | Isopropyl ether |  |  |
| Dichlordifluormethane | 111.5 | 39.5 | Isopentane |  |  |
| Ethyl fluoride |  |  | Isopropyl amine |  |  |
| Hydrogen sulphide | 100.4 | 80 | Isopropyl chloride |  |  |
| Hydrochloric acid | 51.4 | 82 | Isopropyl ethylene |  |  |
| Hydrobromic acid | 90 | 84 | Isobutane | 134 | 37 |
| Hydrogen selenide | 138 | 88 | Isopropyl alcohol | 235 | 53 |
| Isobutane | 134 | 37 | Isoallyl | 234.4 |  |
| Ketene |  |  | Methyl acetate | 234 | 46 |
| Methyl chloride | 143 | 73 | Methyl formate | 214 | 60 |
| Propane | 95.6 | 44 | Methyl alcohol | 240 | 79 |
| Propylene | 92.3 | 45 | Methyl amine | 157 | 74 |
| Dimethyl ether | 130 | 53 | Methyl bromide | 194 |  |
| Trimethylene |  |  | Methyl ethyl ether | 165 | 43.4 |
| Vinyl chloride |  |  | Methyl nitrite |  |  |
|  |  |  | Methyl phosphine |  |  |
| *To 250° C.* |  |  | Methyl disulphide |  |  |
| Acrolein |  |  | Methyltetramethylene |  |  |
| Allyl chloride |  |  | Methylene chloride |  |  |
| Acetaldehyde | 188 |  | Methylal | 224 |  |
| Acetone | 235 | 47 | Propyl chloride | 230 | 45.2 |
| Amylene | 201 |  | n-Pentane | 197 | 33 |
| i-Amylene | 192 |  | Propyl amine | 224 | 46.3 |
| Butyl alcohol-tert | 235 |  | Pentane, iso- | 188 | 33 |
| n-Butane | 153 | 36 | Petroleum ether | 211 |  |
| Carbon suboxide |  |  | Nitrogen tetroxide—NO₂ | 171 | 147 |
| Cyclopentane |  |  | Sulphur dioxide | 157 | 78 |
| Dimethylamine | 165 | 52 | Trimethylamine | 161 | 41 |
| Diethylamine | 224 | 36.2 | Trifluortrichlorethane | 187.6 |  |
| Diisopropyl | 227 | 30.5 | Vinyl ether |  |  |
| Diallyl | 234 |  |  |  |  |

For temperatures above 250° C. a much greater list could be given. Slight variations in the above figures are given by various observers.

going treatment, and this fact should be taken into considertaion when regulating the temperature of the apparatus A. Even the smallest impurities* or admixtures are sufficient to considerably change the critical temperature of a substance. Thus, the critical temperature of a certain volume of chloroform is reduced by one drop of alcohol 4° C. while the change in boiling point is only 0.2° C. The same addition raises the critical temperature of ethyl chloride 7° C. and the boiling point only 1° C.

*Altschul, M.-Ber. d. deutsch. Pharm. Ges. 6 (1906) 11–17.

Constant boiling liquids (mixtures), heterogeneous as well as homogeneous, are included in such "gaseous mixtures" used.

Below are given a few examples of these latter. I do not limit myself to these mixtures.*

| Boil. pt., °C., atm. pr. | Mixture | Composition |
| --- | --- | --- |
| 33 | Water and ethyl ether | Heterogeneous. |
| 37 | Ethyl alcohol and ethyl bromide | 3:97. |
| 38 | Carbon disulphide and methyl alcohol | 87:13. |
| 39.5 | Carbon disulphide and methyl acetate | 71:29. |
| 42.5 | Carbon disulphide and ethyl alcohol | 91:9. |
| 53.5 | Methyl alcohol and chloroform | 12:88. |
| 55.5 | Methyl alcohol and carbon tetrachloride | 20.6:79.4. |
| 58 | Methyl alcohol and benzene | 38.4:61.6. |
| 59 | Ethyl alcohol and ethyl acetate | 47:53. |
| 64.8 | Benzene, ethyl alcohol and water | 74.1:18.5:7.4. |
| 68 | Ethyl alcohol and benzene | 32.4:67.6. |
| 71.5 | Ethyl alcohol and ethyl acetate | 31:69. |
| 74.8 | Carbon tetrachloride and ethyl alcohol | 77.15:22.85. |
| 79.5 | Benzene and isobutyl alcohol | 90.5:9.5. |
| 84.5 | Water and toluene | Heterogeneous. |
| 91 | Propyl alcohol and toluene | 53:47. |
| 92.5 | Water and pyridine | 41:59. |
| 95 | Water and terpinene | Heterogeneous. |
| 95 | Water and chloral | 7.93. |
| etc., etc | | |

*Golodetz, A.-Chem. Ztg. 1914, 1253.

My apparatus has, as above stated, a general applicability and can be operated in connection with a great many materials, organic and inorganic, and for a variety of purposes. Thus it can be used in the deodorization, purification and fractionation of oils in general,—vegetable, animal, fish, mineral, petroleum, shale, tar, essential oils,—fats, tars, organic materials, synthetic materials and products, etc., in fact any material or mixture of materials possessing sufficient fluidity to be pumped at the operating temperature employed in the special case.

It can also be used in manufacturing new products, such as the making of soap and recovering the glycerine, making and separating condensation or polymerization products, making and fractionating synthetic lubricating oils, pour point depressants, separating paraffin, etc.

The apparatus can be used to advantage particularly in the petroleum and mineral oil industry. It is here where it can assume special importance, for instance, in the purification of petroleum oils and distillates in general, the preparation of high grade lubricating oils from low grade lubricating oil stocks, also in the refining of paraffin containing stocks, asphaltic and naphthenic oils, paraffin wax (also its separation), waxes, tars, residues, etc.

Description of the apparatus.

In referring to the drawing and more particularly to the parts thereof: Figure I. A represents a vertical, closed treating vessel or chamber with inlet and outlet openings and valves 1, 2, 3. Coil G is arranged around the inner walls of said chamber with ends extending outside of said chamber and connected for the influx and efflux of heating means.

Chamber A contains disposed therein pipe coils F and D, chamber E' surrounded by chamber D', and the receptacles B and C. Coil F connects with chamber E' at c', chamber E' connects with chamber D' and coil D by means of the pipe p. Coil F has an outside opening at b, n. B and C are receptacles, B being connected with coil D at h, and with chamber D' at h', and C with chamber E' at i.

The receptacles B and C in turn have conduit aperture f and g at the bottom (leading, for instance to outside containers), also openings at r near the top with connecting pipes or tubes k, d, l, leading to an outside compression apparatus Y.

Receptacle C also has a special pipe conduit m, valve 5, leading outside (cf. below).

1, 2, 3, 5, 9, 10, 11, 12, 13, 15, 16, 20, are valves;
4 represents a regulable pressure relief means.
6, 7, 8, are "rotary, or rotatable valves" (cf. Fig. II), which act on the principle of "rotary pumps", and are for the purpose of transferring a liquid from one zone to another, but not "gas", and are regulable as to speed.

4, 4', 4''', 4'''', 17, 18, 19, are regulable pressure valves.

F represents a high pressure coil and E' a high pressure extraction and reaction chamber. D represents a reduced pressure coil and D' a reduced pressure chamber. The use of D or D' is alternative, when D' is employed, the valve 15 is closed.

In describing the apparatus and the parts of the same more particularly, before describing the actual operation of the apparatus, I may say, the closed chamber A is used for regulating the temperature of the contents of the various coils D, F, high pressure chamber E' and inner receptacles B, C. This can be done in various well known ways. A liquid, i. e. heated liquid or gaseous medium may be passed into chamber A through valve 1 and out of valve 3, valve 2 in this case being closed. Or, a heating fluid may be passed through the coil G, valves 1 and 3 being closed and valve 2 opened, its conduit being connected with a return condenser (not shown); the chamber A in this case contains a volatile liquid for regulating the temperature of the contents in the enclosed parts of the chamber. This liquid may be kept at atmospheric pressure, under sub-atmospheric, or under super-atmospheric pressure, thus affording a means of varying its temperature and that of its vapor. The chamber A may also be heated by applying heat externally, etc.

Receptacles B and C are "gas-liquid" separating zones or chambers, B for the extract and C for the raffinate, or residue. C has a special outlet m, 5, usable in recycling operations of the material under treatment. r, r', r'' are bypasses.

E' is a compression chamber for the selective gaseous solvent medium and simultaneously also a contacting, treating and extracting chamber, and D' is an expanding and extract-separating chamber. Chambers E' and D' are in heat exchange relation with one another, the heat of compression generated in this chamber is absorbed by the surrounding expansion chamber D' and its contents. The selective gaseous solvent medium is brought to or above its critical point in the chamber E' while the material to be treated is led in under a superior pressure through conduit F at c' into E' simultaneously.

Chamber E' may contain Raschig rings, baffles, or other known suitable contact means and means for securing turbulent counter-current flow; it may also contain solid catalytic material, or contact material coated or impregnated with a catalytic material.

The selective gaseous solvent medium or fluid passes through conduit $a'$ into the extraction chamber E', flowing upwardly, while the material to be treated or extracted, fractioned or separated, passes through the conduit F, $c'$ into the chamber E', flowing downwardly in counter-current to the gaseous fluid. The selective gaseous solvent medium containing the extracted fraction of the material, or materials, under treatment passes out of the chamber E' at the upper end $p'$ and through the pressure reduction means 4' downwardly into the expansion chamber D', surrounding the chamber E', thence, with the liberated extract, through the conduit $h'$ $q$ into the separating chamber or receptacle B. Fig. I, etc. The raffinate or insoluble residue passes out of the chamber E' at $i$ to the receptacle C (shown in Fig. I).

Y represents a recompression means for the gaseous solvent medium, for recycling purposes.

A number of expansion chambers may be arranged in series for obtaining a number of separate extractions by a stepwise pressure reduction in the series. Also, a second expansion chamber may surround the primary expansion chamber, operating at a still lower pressure, and suitably connected, for the same purpose.

Single counter-current treaters or extractors with one or a plural number of expansion chambers or means have been described above. A multiple or plural number of counter-current treaters may be used in series for the continuous treatment of a liquid material with a number of different or similar selective gaseous solvent mediums. My apparatus is, therefore, capable of many modifications and not limited to the use of a single counter-current treater and expander, nor to the use of a single selective gaseous solvent fluid.

Fig. II shows a cross-sectional view of a means for separating a liquid from a compressed "gas", i. e. a liquid and a gas under different pressures, by passing the liquid from a higher pressure area to a lower pressure area or zone, without releasing an appreciable amount of the "gas" at the same time. This "rotary valve" is operated at such speeds commensurate with the removal of the desired amount of accumulated liquid material.

*Operation of the apparatus—Fig. I*

1. Simple separations and extractions. Example: crude lubricating oil stock.

Close valves (2, 5, 9, 13) and open valves (1, 3, 10, 11, 12, 16, 21). Have chamber A at the operating temperature of the selective gaseous solvent medium, i. e. at a temperature at which the same remains in a gaseous state even when its pressure is reduced, applying heating means when necessary. A suitable selective gaseous solvent medium is now passed at or above its critical point through the conduit $a$, valves 16, 12 and pressure regulating means 4'''' set at the operating pressure, into the chamber E' at O', thence through the regulable pressure relief valve 4 set at the operating pressure, and through the expansion chamber D', or coil D which is under reduced pressure, thence into and through the chamber or receptacle B and the conduit or tube $d$ back to the recycling compression means Y, valve 16 being closed for isothermic re-compression of the "gas" to its critical point. The material to be fractioned or extracted,—e. g. the crude lubricating oil stock,—by the selective gaseous solvent medium is pumped simultaneously, at approximately the temperature of the selective gaseous solvent medium or fluid, but under a pressure greater than that exerted by the compressed gaseous medium, through the conduit $b$, valve 11 and pressure regulating means 4''', whence it passes into chamber E' through the opening $c$, thence downwardly in the chamber E' in counter-current turbulent flow to the upwardly flowing selective gaseous solvent medium. The raffinate passes in its downward flow through the "rotating valve" 7 and conduit $i$ into the separating chamber C, which is under reduced pressure and where the part of the selective gaseous solvent medium in solution in the raffinate passes through the conduit $l$ back to the recycling isothermic pressure means Y, valve 16 being closed. The rotating valve 7 is for the purpose of transferring the liquid raffinate, or residue, from the high pressure to the lower pressure area without substantially reducing the pressure in the chamber E' by gas liberation. This raffinate or residue may be retreated or recycled in contact with the selective gaseous solvent medium by passing it through conduit $m$ and valve 5 back to the compression means and thence back to the extraction apparatus, through conduit $b$, or it may be removed through the conduit $g$ by means of the rotary valve 6 to an exterior receiving means, etc. $r$, 18 are conduits for by-passing excess of pumped material back to the supply means.

The selective gaseous solvent medium, passing upwardly through the pressure chamber E', carries with it the dissolved extract from the crude lubricating oil stock and, passing through the pressure release valve 4, flows downwardly with the now separated liquid extract through the coil D or chamber D' into the separating receptacle B. Here the separated gaseous fluid flows through the conduit $d$ and valve 10 to the compression means (e. g. Y), valve 16 being closed, while the liquid extract passes by way of the rotary valve 8 to an outside receiving means. We have thus separated an extract from a raffinate, or residue, in a continuous process with my apparatus, the gaseous fluid being recycled back to the extraction or treating apparatus. The speed of the rotary valves is properly regulated to insure a proper working of the apparatus. The combined gaseous fluid is reused, as above described.

The ratio or proportion of the quantity of extractant ("gas") to the quantity of material undergoing treatment, or being extracted, at a given time can be varied by regulating the flow of the two mediums through conduits $a$ and $b$ respectively by means of the valves 11 and 12—which can be made automatic—or otherwise, use being made of by-passing the substances simultaneously through pressure regulating means 17, 18, 19.

Again, after extracting the material with one selective gaseous solvent medium as above described, it may be repassed or recycled through the apparatus with the same or with a different kind of selective gaseous solvent medium, in order to obtain a second kind of extract. Or, the pressure in the expansion coil D or chamber D' and receptacle B may be reduced, not completely but stepwise in a number of successive recycling operations on the same material, and the extract obtained each time removed from the receptacle B by means of the conduit $f$ and rotary valve $8'$.

The apparatus has a general applicability and can be used with a great many materials, organic and inorganic, and for a variety of purposes. Thus it can be applied in the deodorization and purification of vegetable, animal and fish oils and fats, to fractionation of essential oils, to the fractionation and treatment of petroleum, mineral, shale, coal, etc. oils and fractions and residues, also to tars, to synthetic products; in short, it can be applied to all substances possessing liquidity, or sufficient liquidity, at the operating temperature of the selective gaseous solvent medium. It can also be employed in carrying out simultaneously chemical changes and reactions and separations and fractionations.

For instance, the apparatus can be also used in such manufactures as the making of soap and recovery of the glycerine in one operation. Thus, in a continuous process, the saponifiable oils and fats can be mixed with a saponifying medium in proper proportions previously, and passed in a liquid condition at elevated temperature and pressure into conduit $b$, or, the oils and fats can be passed at elevated temperature and pressure into this conduit $b$, and the requisite quantity of saponifying medium, in proper regulated proportions and at elevated temperature and pressure can be passed simultaneously into conduit F through valve 9. The thus combined products are forced upwardly in turbulent flow through the coil F and thence under superior pressure through the opening $c$ into the chamber $E'$ downwardly, thus intimately contacting in counter-current flow, with suitable turbulation and agitation, at a now approximately equal temperature and pressure, an upwardly flowing selective gaseous solvent medium for the glycerine at or above the critical point (e. g. critical temperature and pressure) of said gaseous solvent medium or fluid, introduced through conduit $a$ through the opening $o$ into the chamber $E'$. The selective gaseous solvent medium, carrying the dissolved glycerine in solution, passes onward through the conduit $p$ and the pressure release means 4 into the expansion chamber $D'$ or coil D, where a separation of the glycerine from the gaseous fluid takes place. The glycerine collects in the receptacle B, while the selective gaseous solvent medium is maintained in a gaseous state by reason of heat exchange between the expanded gaseous fluid and the heating medium in the apparatus A, surrounding the expansion chamber $D'$ or coil D. The selective gaseous solvent medium passes through conduit $d$ back to the isothermic pressure apparatus (valve 13 being closed). The molten soap produced, now minus the glycerine, flows downwardly and is passed by means of the rotary valve 7 into the expansion receptacle or chamber C where such "gas" as was dissolved in it passes through conduit $l$ back to the isothermic pressure means. The molten soap can be removed from receptacle C by means of the rotary valve 6 (valve 5 is closed). Should a repassing or re-cycling of the soap be desired for further possible extraction, this can be done by means of the conduit $m$ and valve 5 and passage of the molten soap to the pressure apparatus and back again to conduit $a$, etc.

My apparatus for continuous selective gaseous solvent extraction can be used to advantage particularly in the petroleum, shale and coal tar industries. It is here where it can assume special importance, for instance, in the fractionation and purification of oils and distillates, residues and tars generally, the preparation of high grade lubricating oils from low grade lubricating oil stocks, also in the refining of paraffinic, asphaltic, and naphthenic oil stocks and products, waxes, tars, residues, etc. The apparatus can also be used advantageously for simultaneously bringing about chemical reactions, condensations, polymerizations, etc., and fractionating and separating the resultant products.

*Simultaneous chemical or physical material changes and separator fractionations with the use of my apparatus.*—In these cases the apparatus is used as above described, but chemically reactive, condensation, polymerization, etc. materials or catalysts, or both, are introduced concurrently through the conduit F and valve 9, with the materials (such as unsaturated hydrocarbons, cracked mineral oil distillates, halogenated paraffinic hydrocarbons, cyclical hydrocarbons mixed with cracked distillates, halogenated, high boiling hydrocarbons mixed with cyclical hydrocarbons-naphthalene, anthracene, phenanthrene, or tar residues, distillation residues, etc.) being introduced through conduit $b$ and valve 11, both having preferably been brought to approximately the same temperature as that of the selective gaseous solvent medium raised to its critical point and entering the apparatus through conduit $a$. Again, cracking gases mixed with the selective gaseous solvent medium may simultaneously be introduced through conduit $a$ with high boiling hydrocarbons through conduit $b$ and catalysts through conduit $n$. Catalysts, when used, may be aluminum chloride, iron chloride, phosphoric acid, boron halide, etc.

The chemical reactions, condensations, and polymerizations occur in chamber $E'$ (in part they may occur in coil F) and the separations, or fractionations in chambers $E'$ and D, etc.

As the critical point of the selective gaseous solvent medium varies with the latter's content of extracted material, being either lower or higher than that of the chosen gaseous fluid itself, this should be taken into consideration when operating the apparatus, and should be previously experimentally determined.

In the operations outlined above in connection with the apparatus shown in Fig. I, the selective gaseous solvent medium is preferably brought to or above its critical point before introduction into the apparatus through conduit $a$. The compression of the gaseous medium is preferably done in the chamber $E'$. The material to be treated is preferably brought to the temperature of the respective selective gaseous solvent medium used, previously to being introduced into the conduit $b$ of the apparatus.

My apparatus, with the modifications to be described below, can be applied to other uses than that of selective gaseous solvent extraction. For instance, a volatile liquid can be separated from a non-volatile liquid in the following manner: Example, apparatus for continuous manufacture of soap and recovery of the glycerine. Cf. Fig. I. Valve 4 is eliminated, conduit $p$ extended, the conduit leading from $p$ into $D'$ and the conduit $h'$ leading from $D'$ into B eliminated, and the parts D, B, $f$ and 8 are arranged outside of apparatus A, coil D being used as a condenser. Baffles or other means for ensuring turbulent flow and agitation are arranged inside chamber $E'$ and coil F. Valves 10 and 5 are closed, and rotary valves 6, 7, 8 are closed at the beginning of the operation. Valve 12 is opened and conduit $d$ connected with an evacuating apparatus or pump.

The contents of chamber A are heated to approximately 250–300° C. The vacuum pump is started, the connecting parts B, D, E', F evacuated and heated, saponifiable material passed through conduit b and valve 11, and a proper proportion of heated saponifying medium simultaneously passed through conduit j, valve 9 into coil F. The mixture of saponifiable material and saponifying medium flows in turbulent flow and with agitation upwardly in coil F and through the opening c downwardly in chamber E', where it intimately contacts in counter-current turbulent flow superheated steam, or other inert gaseous fluid, flowing upwardly in chamber E', entering the apparatus through conduit a and the chamber E' through the opening o. The glycerine extracted by the steam is condensed with steam in coil D and collects in receptacle B, whence it can be removed by means of rotary valve 8. The extract-liquid soap flowing downwardly in chamber E' is collected in receptacle C by passing the rotary valve 7, and can be removed therefrom by means of rotary valve 6, or recycled through conduit m, valve 5, back to the pump installed for this special purpose.

In using "gases" liquid at ordinary temperature, i. e. liquid below their critical temperature, they should first be gasified before starting the operation, and the temperature of the expansion chamber so regulated that the "gas" materials retain their gaseous state, this preferably continuously during the operation of the process. The construction of the apparatus may thus be modified to suit these conditions.

Another modification of my apparatus may be the following: Normally, conduits of tubes l, leading from receptacle C and d, leading from receptacle B, are directly connected with the compression apparatus. In the modification, a condensing means is interposed, so that with certain "gases" that are readily liquified, these are pumped as liquids and not as gases into the contacting stage E', where they are instantaneously gasified and raised to their critical point for extractive purposes, or a special heating coil or means may be interposed between the pumping means and conduit a, for reconverting the liquified "gas" into a gas at or above its critical temperature and pressure, e. g. critical point.

My apparatus can be employed for carrying out my process at temperatures below normal room temperatures, at room temperatures, or at above normal room temperatures. Materials not decomposed or changed at temperatures above 250° C. may be treated in my apparatus with "gases" having a critical temperature, e. g. critical point of 250° C. and above.

The proportion, i. e. ratio of the quantity of gas to quantity of material treated at any one time can be varied to suit the purpose desired, by regulating the speed of flow of the fluids by means of valves 12, 11, and 9, or other regulating means.

Suitable temperature and pressure regulation is provided in the operating system. The temperature or pressure, or both the temperature and pressure above the critical point, or critical temperature and pressure, of the gaseous fluid or medium employed need not be kept uniform, but may be modulated or varied during the carrying out of the process in my apparatus, to obtain end products and effects desired. Thus the pressure release valves 4, 4', 4'', 4''', 4'''', 17, 18, 19, are regulable for regulating the pressure in coils or parts E' and F. The temperature of these latter and of coil D, and chamber D' is also regulable by means of the heating means described, and also by regulating the pressure in chamber A, when a boiling bath of heating liquid is employed. In such a case there is mounted on a return condenser (not shown) connected with conduit t of apparatus A, a regulable pressure valve.

The critical temperatures of gas mixtures can be found by simple trial, or calculated from the critical temperatures of the component gases according to the rule of producing mixtures.

As already indicated, obviously the operations are carried out at or above the critical point of the gas or gas mixture chosen by trial for the special operation, in order to maintain the gaseous solvent in a gaseous state. Also, as the solvent power of the gas at atmospheric pressure is practically nil, there can be a clear separation of the solvent gas from the extract and raffinate, or residue. It is evident that the materials should possess sufficient liquidity so that they can be passed readily through the parts of my apparatus. They need not contain wholly liquid components but may partake of the nature of a sufficiently mobile sludge or slurry containing finely divided solid or semi-solid particles in suspension. Thus when an oil is employed in connection with a solid catalyst, this latter may be contained in the oil in a suspended, highly comminuted state.

The pressure relief valves may be of the nature of a regulator valve for stepping down or lowering the pressures. Valves 9, 11, 12 are valves controlling the inflow of the respective fluids. They may be automatically controlled feed valves operating in conjunction with valves 6, 7 and 8, or vice versa.

Chamber E' of Fig. I may contain baffles or other means for effecting turbulent counter-current flow of the liquids.

In making fractionations, the quality or nature and the quantity of the extracts to be obtained can be regulated, (1) by choosing the most suitable selective gaseous solvent medium, (2) a mixture of two or more selective gaseous solvent mediums in various proportions, (3) by regulating the ratio of the quantity of material to be extracted in a period of time to the quantity of the selective gaseous solvent medium employed in a like period of time, (4) by regulating the pressure in chamber E' Fig. I, for instance, by means of the regulable pressure release means (4) in Fig. I, (5) by regulating the temperature of the operation, and especially the temperature of the selective gaseous solvent medium above its critical temperature, (6) by stepwise pressure reduction in a number of serially arranged and connected expansion chambers (D, D' etc.), (7) by stepwise pressure changes in a number of serially arranged compression chambers (with respective expansion chambers, etc.), etc.

It is understood that there can be a multiplicity of expansion chambers serially connected and arranged with one or a number of compression chambers. With a multiplicity of compression chambers, these may be arranged to operate under different pressures above the critical pressure of the selective gaseous solvent medium, or media.

As indicated, the apparatus can be made to operate in part or wholly automatically, for obtaining the end products desired in an efficient manner. Thus the steps enumerated above (i. e. 3, 4, 5, 6, 7) can all be brought into one mutual automatic control, or any parts thereof can be mutually automatically controlled. Thus the valves 11, 12, also 9, of conductors $b$, $a$, also $n$, and valves 7, 8, 6, also 5 of conductors $f$, $i$, $g$, also $m$, can be automatically and simultaneously regulated to ensure a smooth operation of the apparatus and process, etc.

I claim:

An apparatus for continuous selective gaseous solvent medium extraction and fractionation of materials possessing liquidity at the operating temperature of the process, comprising an enclosed vertical treating vessel with means for heating the same and regulating the internal temperature thereof and including disposed therein and in interconnected combination a high pressure coil connected with an elongated vertically placed compression, extraction and fractionation high pressure chamber, said chamber containing intimately contacting means, and being enclosed in and communicating with a gas and extract separating low pressure expansion chamber in indirect heat interchange relation with said high pressure compression, extraction and fractionation chamber, a regulable pressure reduction means in the connection between said high and low pressure chambers, liquid raffinate and extract receptacles connected with respective bottom outlets of said high and low pressure chambers, means for educting fluids therefrom, means for conducting a selective gaseous solvent medium to said high pressure extraction and fractionation chamber, means for simultaneously conducting a crude liquidity possessing material to said high pressure coil and thence to the high pressure extraction and fractionation chamber, means for intimately contacting and causing a turbulent counter-current flow in said high pressure extraction and fractionation chamber between the downwardly flowing crude material and the upwardly flowing selective gaseous solvent medium, means for withdrawing a liquid raffinate and extract from said respective raffinate and extract receptacles, means for withdrawing the expanded and separated selective gaseous solvent medium from said extraction and raffinate receptacles, and means for recycling and recompressing said selective gaseous solvent medium in said extraction and fractionation high pressure chamber.

HENRY W. F. LORENZ.